US006609534B1

(12) United States Patent
Beaney et al.

(10) Patent No.: US 6,609,534 B1
(45) Date of Patent: Aug. 26, 2003

(54) MULTI-ADDITIVE INJECTION SYSTEM FOR AVIATION FUEL

(75) Inventors: Brian Frederick Beaney, Hallam (AU); Bruno Peter Paul La Terra, Melbourne (AU)

(73) Assignee: Fluid Transfer Limited, Nailsworth (GB)

(*) Notice: Subject to any disclaimer, the term of this patent is extended or adjusted under 35 U.S.C. 154(b) by 0 days.

(21) Appl. No.: 09/822,829

(22) Filed: Nov. 13, 2000

(30) Foreign Application Priority Data

Sep. 1, 2000 (AU) .......................................... PQ 9845

(51) Int. Cl.[7] ...................... B64D 37/18; G05D 11/035

(52) U.S. Cl. ............................ 137/87.03; 137/101.21; 137/101.31; 137/487.5; 141/231; 222/608; 244/135 A

(58) Field of Search ............................... 137/87.03, 98, 137/101.21, 101.31, 486, 487.5, 899; 141/231; 222/608; 244/135 A, 135 R

(56) References Cited

U.S. PATENT DOCUMENTS 2,735,717 A * 2/1956 Harman .................. 244/135 A
3,227,196 A * 1/1966 Meehan ......................... 141/9
3,667,495 A * 6/1972 Schuler et al. ......... 137/101.21
4,714,087 A * 12/1987 Jones .......................... 137/98
4,886,282 A * 12/1989 Wilkinson et al. .......... 141/231
4,932,609 A * 6/1990 Secchiaroli et al. .... 244/135 R
5,174,383 A * 12/1992 Haugen et al. ............... 169/15
5,441,072 A * 8/1995 Indey et al. ........... 137/101.21
5,944,074 A * 8/1999 Leahy et al. ................ 141/192

* cited by examiner

*Primary Examiner*—Michael Powell Buiz
*Assistant Examiner*—Ramesh Krishnamurthy
(74) *Attorney, Agent, or Firm*—Edwin D. Schindler

(57) ABSTRACT

A multi-additive injection system for injecting required amounts of different additives to flowing fuel in a fuel line (6) comprises a number of additive injection sub-systems (1, 2, 3 and 4). Each sub-system includes a source of additive (7), a pump (13) to deliver additive from the source (7) to the fuel line (6), and an additive meter (21) to measure an amount of the additive being delivered to the fuel line (6) by the pump (13). The multi-additive injection system further includes a meter to measure the amount of fuel flowing through the fuel line (6) and a control device such as a computer to control the pump (13) of each sub-system to adjust the amount of additive being delivered by each pump, should the amount metered by the meters (21) deviate.

33 Claims, 8 Drawing Sheets

MULTI-ADDITIVE INJECTION SYSTEM FOR AVIATION FUEL

FIELD OF THE INVENTION

The following invention relates to a multi-additive injection system primarily for aviation fuel. More particularly, though not exclusively, the invention relates to the real-time addition of additives in correct proportions both before and after a fuel filter in a hydrant servicer cart for use at airports. In more general terms, the present invention relates to a system designed to inject aviation fuel additives in the main jet fuel stream on aircraft refuelling hydrant carts, self-powered hydrant carts or aircraft refuelling tankers. By injecting in-line and close to the aircraft, additive losses in storage and distribution are minimised. Consequently, reduced concentrations of additives can be considered.

Commercial aircraft for example require standard aviation fuel that is available from pressurised underground mains accessed by hydrants at the loading/unloading aprons of airports.

Some aircraft, such as military aircraft, require a special blend of fuel that is not available at most commercial airports. Therefore, such aircraft must return to military airbases for refuelling. In situations such as wartime, this poses serious limitations on military strategics.

It is known to provide hydrant servicer carts at commercial airports which can remain on the apron at a particular bay while being readily movable from one side of an aircraft to the other. Such carts often include a refuelling platform for supporting an aircraft refuelling person or persons, the platform being capable of being raised to a refuelling position at the wing or fuselage of the aircraft. Such carts have a hydrant hose having a coupler for connection to an airport fuel hydrant, a fuel conveying boom which receives fuel from the hydrant hose, the boom being vertically extendible and retractable and capable of conveying the fuel. A fuel hose is coupled to an upper end of the boom and receives fuel from the boom for delivery to the aircraft. A fuel filter is often provided on such carts to ensure that the aircraft receives properly filtered fuel.

It would be extremely beneficial if such carts could be provided with means for providing controlled-dosage real-time addition of a plurality of fuel additives during a refuelling operation. This would enable military aircraft for example to be refuelled at commercial airports provided with such carts. Such carts would include a storage vessel for each fuel additive or a multi-compartment vessel containing all of the required additives in appropriately sized compartments.

It might also be desirable to provide a means of real-time injection of additives to a flow of liquid such as fuel. Such a flow of liquid might be the flow of fuel to a storage tank.

It would further be desirable to provide a multi-additive injection means for a fuel line wherein the supply of individual additives can be independently controlled and even turned off, for example, when other additives are still being injected.

It would also be desirable to provide a monitoring process for each additive simultaneously while fuel is flowing in the main stream. A computer system might monitor each additive and record the amounts and calculate the percentage concentration of each additive according to pre-programmed data and record the results.

OBJECT OF THE INVENTION

It is the object of the present invention to overcome or substantially ameliorate at least one of the above disadvantages and/or more generally to provide a multi-additive injection system, typically for aviation fuel and preferably providing one or more of the above advantages.

DISCLOSURE OF THE INVENTION

There is disclosed herein a multi-additive injection system for injecting required amounts of different additives to flowing fuel in a fuel line, the system comprising:

- a plurality of additive injection sub-systems, each sub-system comprising:
  - a source of additive,
  - a pump to deliver additive from said source to said fuel line,
  - additive metering means to measure an amount of said additive being delivered to said fuel line by said pump,
- said multi-additive injection system further comprising:
  - fuel metering means to measure an amount of fuel flowing through said fuel line, and
  - control means responsive to said additive metering means and said fuel metering means to control said pump of each sub-system to adjust said amount of additive being delivered by each said pump, should an amount of additive metered by said additive metering means deviate from a predetermined amount.

Preferably each additive sub-system delivers its respective additive to said fuel line at a different position along said fuel line.

Preferably said fuel line has in-line therewith a fuel filter.

Preferably one or more of said additives is added up-stream of said filter and one or more of said additives is added to the fuel line down-stream of said filter.

Preferably said additive metering means monitors mass and percentage concentration of said additive in relation to the flow rate of fuel in the fuel line.

Preferably said additive metering means and fuel metering means act simultaneously while fuel is flowing through said fuel line.

Typically, the quantity of each additive injected into the jet fuel as measured by the flow meters will be reconciled against measurements of the amount of additive in the storage tanks to provide failsafe quality assurance. Additive volumes in the storage tanks can be calculated by level measurements or load cells.

Preferably said additive metering means and fuel metering means comprise a computer system which records the respective amounts and calculates the percentage concentration of each additive according to pre-programmed data.

Preferably said computer also acts as said control means.

Preferably each said source of additive comprises an additive tank.

Preferably each additive tank includes means for reading the level of additive therein.

Preferably said computer continuously audits the levels of additive in each tank during operation.

Preferably said computer records said levels of additive.

Preferably four additive injection sub-systems are provided, one for an anti-icing additive, another for a thermal stability improver additive, another for a corrosion inhibiter/lubricity enhancer additive and another for a static dissipater additive.

Preferably the computer compares the flow rate of fuel within the fuel line with the flow rate of additive delivered by each additive injection sub-system to the fuel line so as to calculate a percentage concentration of each additive in the fuel within the fuel line.

Preferably if said percentage concentration cannot be kept within a pre-determined minimum and maximum level, the computer system will shut down the refuelling operation.

Preferably said fuel metering means comprises a mass flow meter.

Preferably said additive metering means comprise mass flow meters.

Preferably each fuel additive tank is sized according to the quantity of fuel required in a particular refuelling operation, each tank being fitted with an electronic level gauge, air vent and quick-disconnect suction line.

Preferably each tank is manufactured from a material compatible with the additive intended to be stored therein.

Alternatively, each additive tank can be a container in which the additive is purchased and suction fittings can be supplied to accommodate the container.

In such instances, the quantity of additive in each tank can be monitored by a load cell or cells under each tank.

For fuel additives that are hydroscopic, the tank can be provided with a silica gel crystal air vent to absorb water from the air.

As an alternative, each additive tank can be formed as a discrete compartment within a unitary structure. Appropriate suction connections can be fitted to suction ports provided at each compartment.

Each compartment can be provided with an air vent connected to a common manifold. Preferably the manifold can be fitted with a silica gel crystal air vent to absorb water from the air.

Preferably the unitary structure can be provided with fork lift pockets to enable a fork lift truck to handle the structure.

Preferably the pump for each additive is a metering type pump unit.

Preferably the metering type pump unit has adjustable pump stroke and motor speed.

Preferably each additive pump is fitted with a double-diaphragm leak detection system.

Preferably each additive injection sub-system comprises a suction isolation valve, a suction strainer, a suction shut-off valve, a suction pressure gauge with isolation valve, a metering pump, a discharge pressure gauge with isolation valve, a relief valve piped back to the source of additive, a discharge shut-off valve and a pulsation dampener with isolation valve and drain valve back to the additive source.

Preferably the computer system will be capable of printing out a transaction ticket showing the following:

total amount of fuel having passed through the fuel line.

total amount of each additive loaded in kilograms or pounds.

flight details.

aircraft serial number or flight number.

date and time.

Preferably the computer system will transmit the above data to a control office main frame computer or desktop computer to process information.

There is further disclosed herein a hydrant servicer cart for use in refuelling aircraft, the hydrant servicer cart including a fuel line for receiving fuel from pressurised underground mains and for delivering the fuel to an aircraft, the fuel line having in-line therewith a fuel filter, the fuel line having connected thereto a multi-additive injection system for injecting required amounts of different additives to flowing fuel in said fuel line, the multi-additive system comprising:

a plurality of additive injection sub-systems, each sub-system comprising:

a source of additive, a pump to deliver additive from said source to said fuel line, additive metering means to measure an amount of said additive being delivered to said fuel line by said pump, said multi-additive injection system further comprising:

fuel metering means to measure an amount of fuel flowing through said fuel line, and control means responsive to said additive metering means and said fuel metering means to control said pump of each sub-system to adjust said amount of additive being delivered by each said pump, should an amount of additive metered by said additive metering means deviate from a predetermined amount, and wherein one or more of said additives is added to the fuel line downstream of said filter.

BRIEF DESCRIPTION OF THE DRAWINGS

A preferred form of the present invention will now be described by way of example with reference to the accompanying drawings wherein.

DESCRIPTION OF THE PREFERRED EMBODIMENT

In FIGS. 1 to 4 of the accompanying drawings there is depicted a graph of typical additive requirements for military aircraft fuel.

Figure 1:
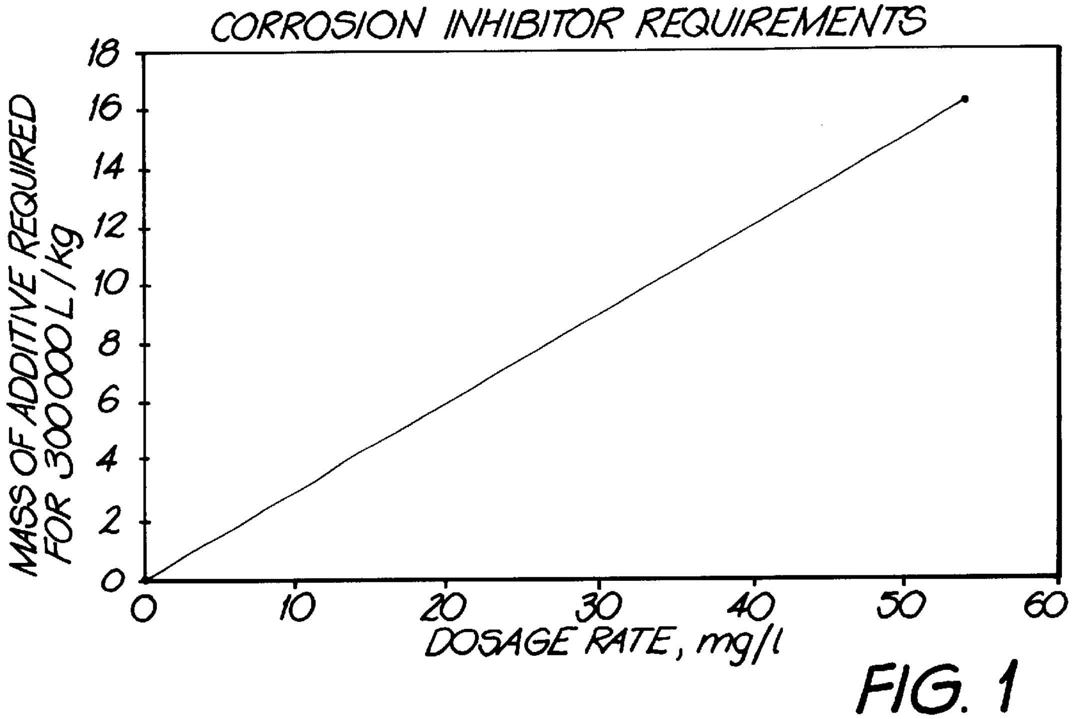
FIGS. 1, 2, 3 and 4 are graphs showing various typical fuel additive requirements.

FIG. 1 is in respect of a corrosion inhibiter/lubricity inhancer additive. This additive protects ferrous metals in fuel handling systems, such as pipelines and fuel storage tanks from corrosion. Some corrosion inhibiters (C.I.) also improve the lubricating properties (lubricity) of certain jet fuels. 6.9 liters of a C.I. additive is typically required for a 300,000 liter load or 0.0023 percentage concentration.

Figure 2:
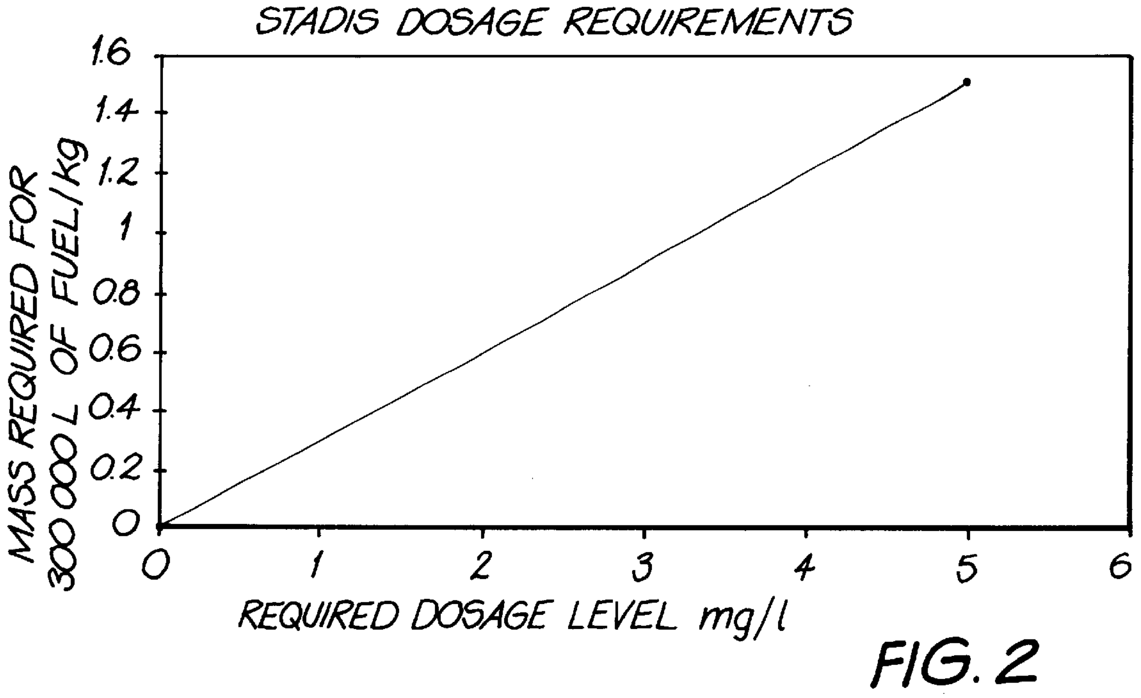

FIG. 2 is in respect of a static dissipater (stadis) additive. This additive reduces the hazardous effects of static electricity generated by moving fuel through modern high-flow rate transfer systems. Static dissipater additives do not reduce the need for bonding to ensure electrical continuity between metal components (eg. aircraft and fuelling equipment) nor do they influence hazards from lightning strikes. 0.9 liters is typically required for a 300,000 liter load or 0.0003 percentage concentration.

Figure 3:
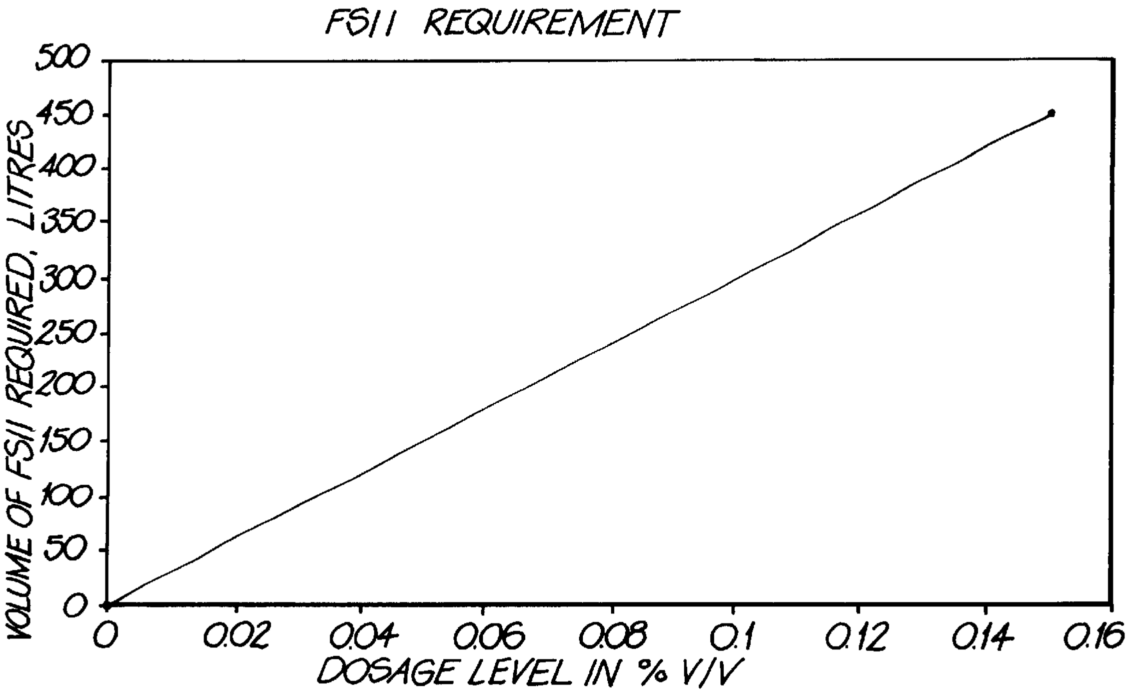

FIG. 3 represents anti-icing additive (FSII) requirements. This additive reduces the freezing point of water precipitated from jet fuels due to cooling at high altitudes and prevents the formation of ice crystals that restrict the flow of fuel to the engine. This type of additive does not affect the freezing point of the fuel itself. Anti-icing additives can also provide some protection against microbiological growth in jet fuel. This additive should not generally be passed through a fuel filter.

A typical amount of additive for a 300,000 liter load might be 150 liters or 0.05 percentage concentration. General specification requirements for FSII additive is 0.1–0.15% and by injecting close to the aircraft, the concentration could be reduced.

Figure 4:
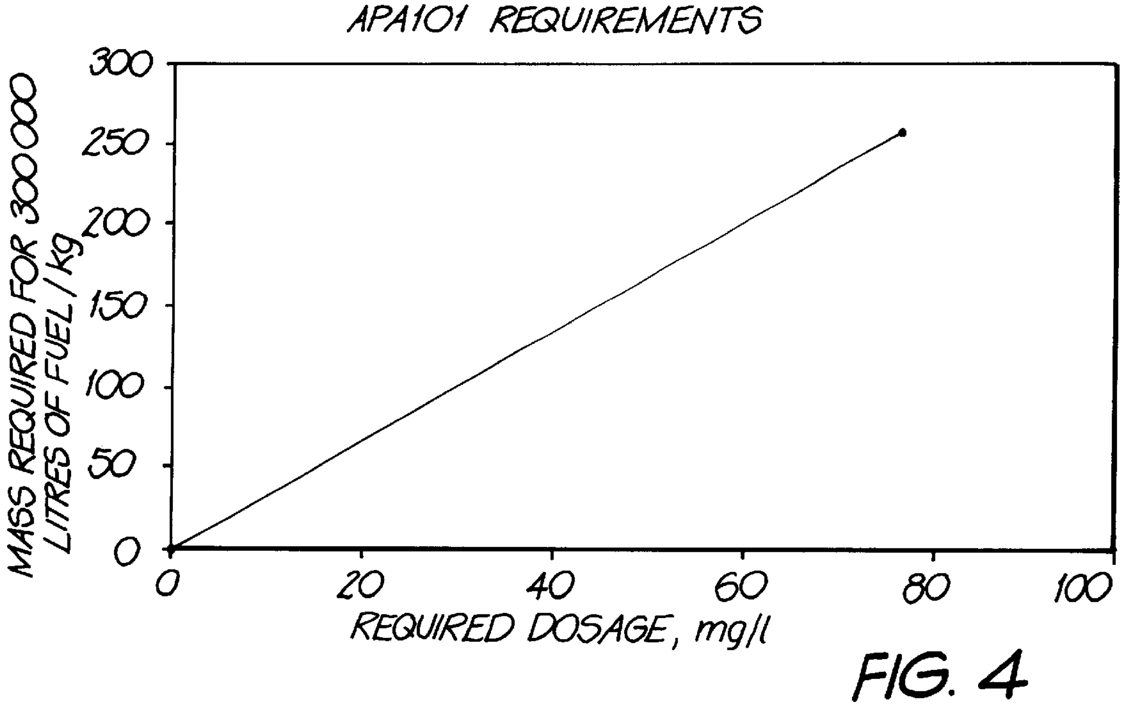

FIG. 4 is in reference to thermal stability improver additive (APA101) requirements. This additive improves the thermal stability of jet fuel and provides fuel heat-dispersing capacity by allowing fuel temperatures to increase by as much as 55° C. (100° F.) without degradation. 76.8 liters is typically required for a 300,000 liter load or 0.0256 percentage concentration.

Figure 5:
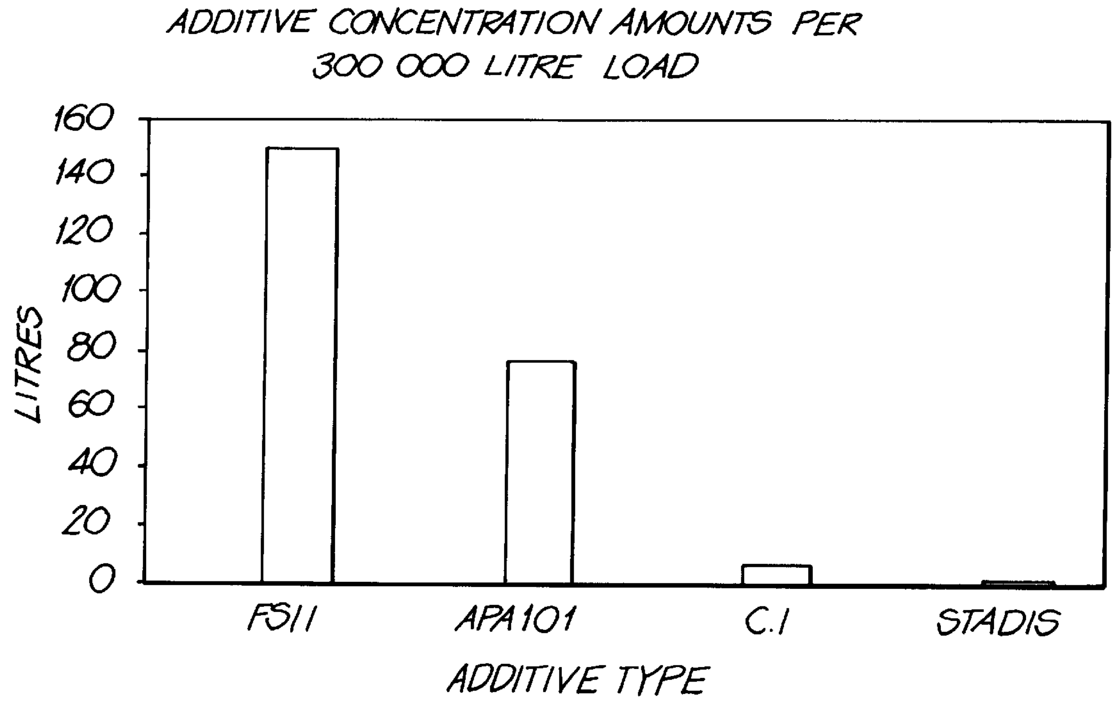
FIG. 5 is a graph showing typical additive concentration amounts for a typical fuel load.

As can be seen and particularly with reference to FIG. 5, the typical additive concentration amounts for a 300,000 liter load vary enormously from one additive to another. This clearly demonstrates the importance of correctly injecting an accurate amount of additive and monitoring the outcome of injecting the additives.

Figure 6:
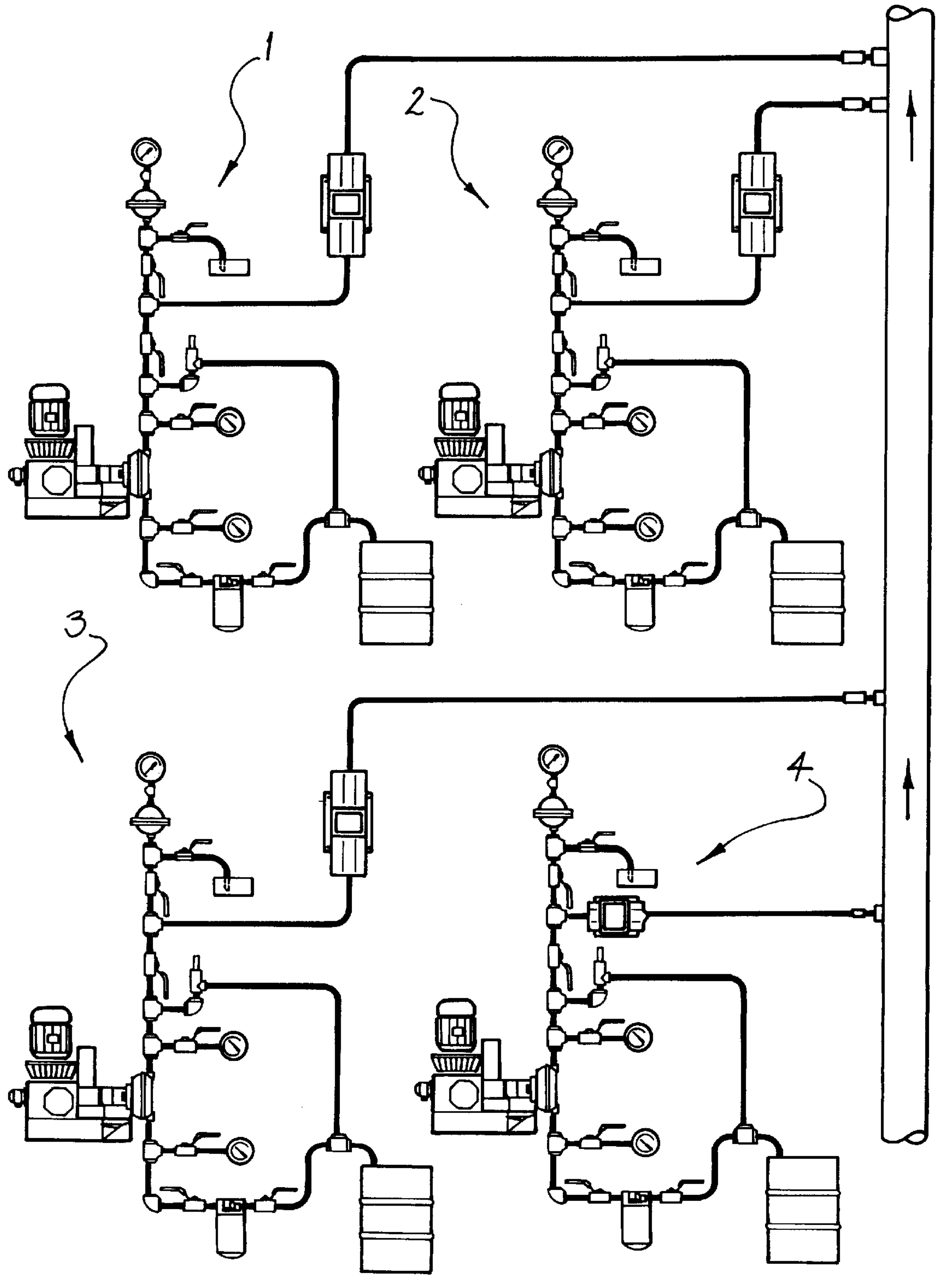
FIG. 6 is a schematic illustration of a multi-additive injection system including four additive injection sub-systems.

The additive injection system of the present invention is typically modular in construction and comprises separate additive injection sub-systems 1, 2, 3 and 4, each injecting an additive to a fuel line 5 as shown in FIG. 6. Additive injection sub-system 1 might be for FSII fuel additive. Sub-system 2 might be for APA101 fuel additive. Sub-system 3 might be for C.I. fuel additive, whereas sub-system 4 might be for stadis fuel additive. Fewer or more sub-systems might be provided depending on the maximum number of additives to be injected to the fuel line 5.

Figure 7:
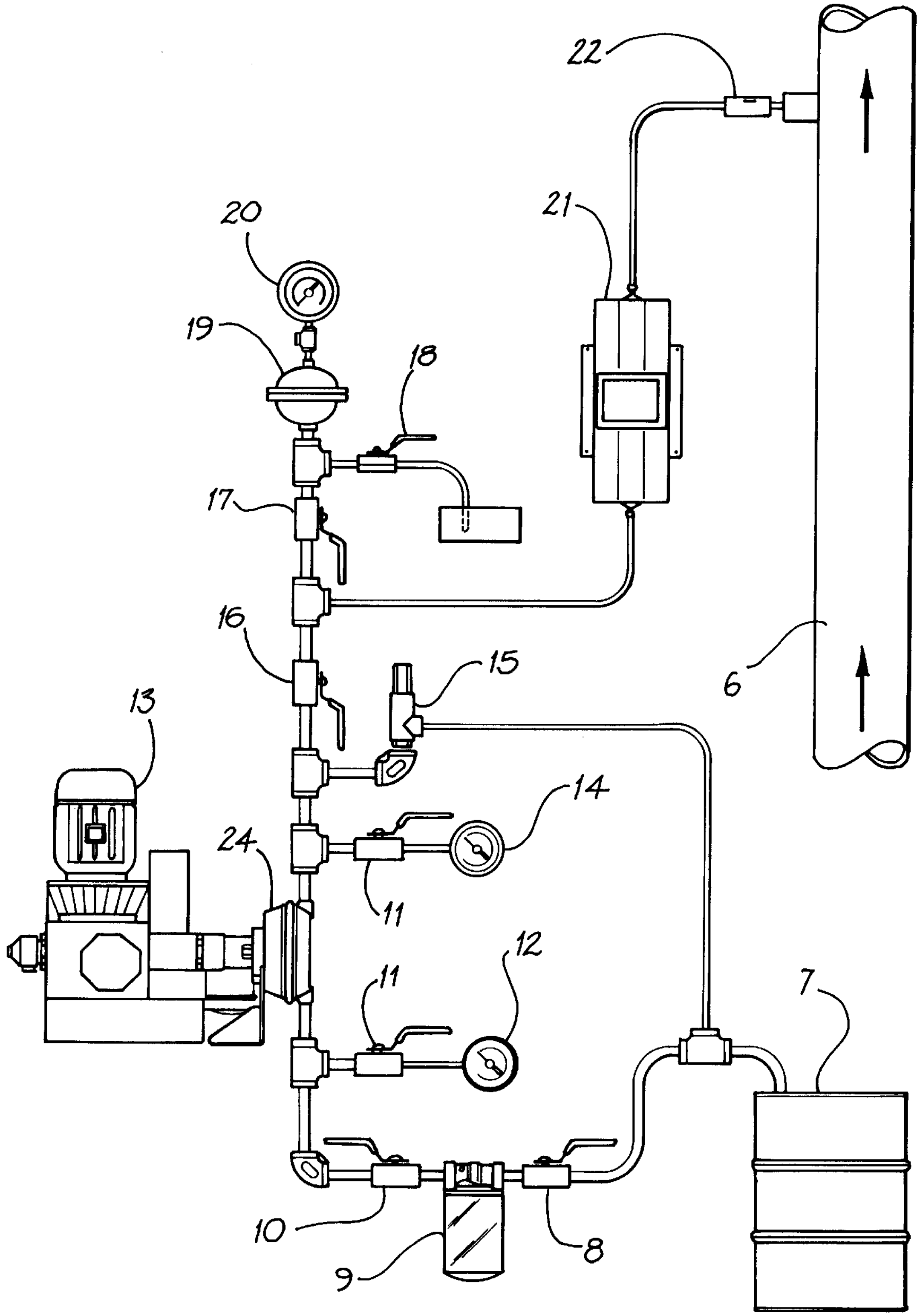
FIG. 7 is a schematic illustration of one of the additive injection sub-systems shown in FIG. 6.

With reference to FIG. 7, each additive injection sub-system includes a fuel additive tank 7 having a stainless steel pipe with an isolation valve 8 leading to a suction strainer 9 to the other side of which there is provided a suction shut-off valve 10 in line to a metering pump assembly which pumps additive through the line in association with a PULSAlarm® double diaphragm leak detection system to be described later. Downstream of the metering pump assembly 13 is a pressure relief valve 15 and a return line to the fuel additive tank 7 and a discharge shut-off valve 16. Downstream of shut-off valve 16, the line branches in one direction to a mass flow meter 21 which meters additive en route via check valve 22 to the aviation mainstream line 6. A pulsation damper 19 is provided in the other branch of the line as well as a pulsation damper pressure gauge 20.

In the main fuel line 6 there is provided a mass flow meter (not shown) sized according to the appropriate flow rate of aircraft refuelling hydrant carts, self powered hydrant carts or an aircraft refuelling tanker. A computer will record the output signal from this meter.

The flow of each fuel additive will be measured by mass a separate flow meter 21 which is sized according to the appropriate percentage concentration required for that additive. The computer will record the output signal from these meters. Each fuel additive sub-system will be fitted with a mass flow meter 21.

The fuel additive tank 7 may be made in accordance with the description provided earlier in this specification.

The fuel additive pump 13 is a metering-type pump unit with the ability for the pump stroke and motor speed to be adjustable independently of each other. The pump 13 might be a Pulsafeeder Model No. P25HJ as manufactured by PULSAFEEDER, a unit of IDEX Corporation. As the mainstream flow rate through fuel line 6 starts to decrease, the fuel additive flow rate will also have to be decreased to maintain the appropriate percentage concentration of additive. This will be achieved by adjusting the pump stroke. If the stroke length is reduced to 50% of its maximum stroke, then the electric motor drive speed for the pump will be reduced. This will keep the accuracy of the pump down to 5% of the maximum flow rate of the unit. The electrical equipment including the motor for pump 13 typically runs on a 24 volt DC power supply. The electric motor is a stepper-type motor to accurately control the number of stokes per minute.

Figure 8:
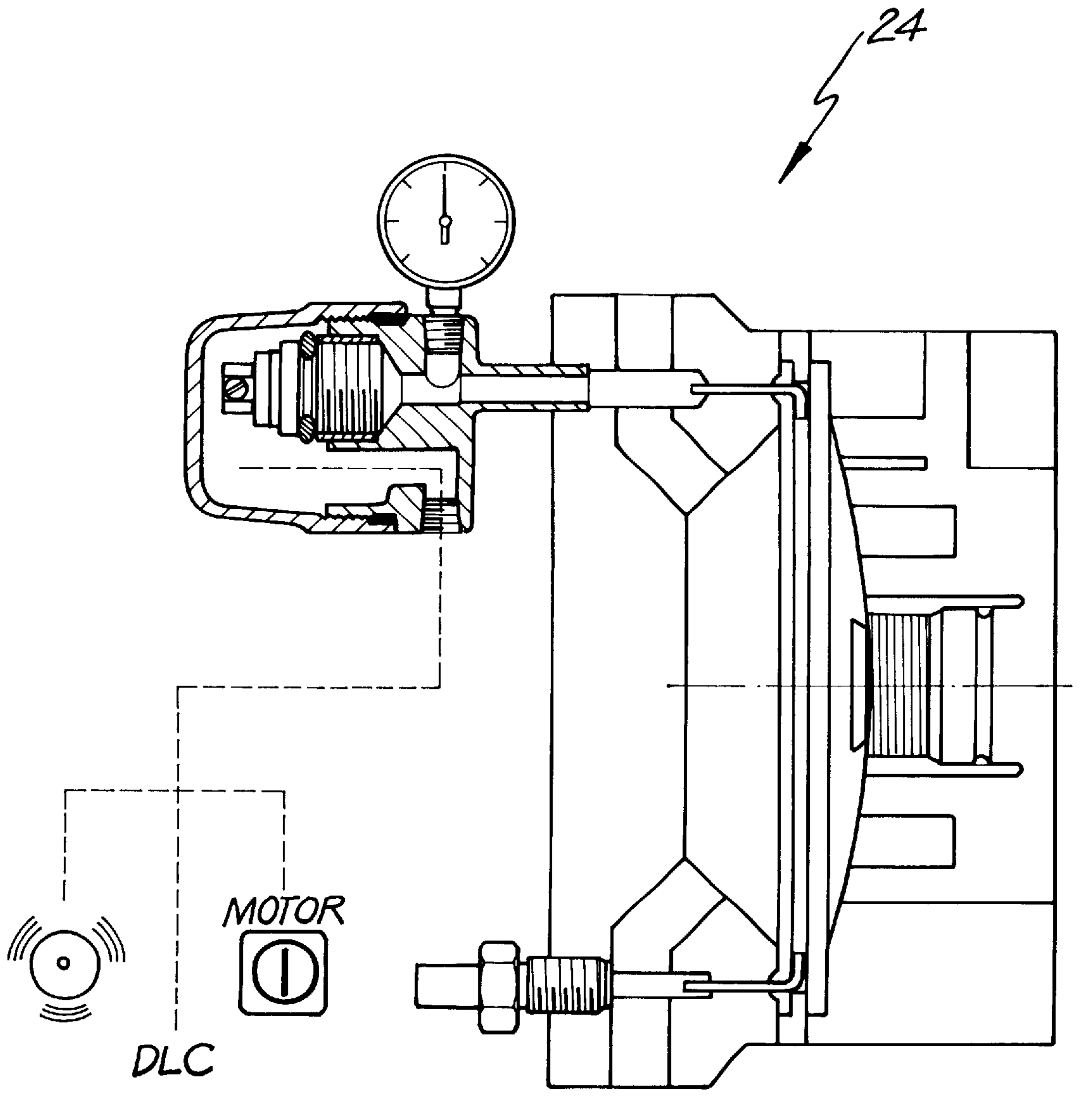
FIG. 8 is a schematic illustration of a double diaphragm leak detection system.
Figure 9:
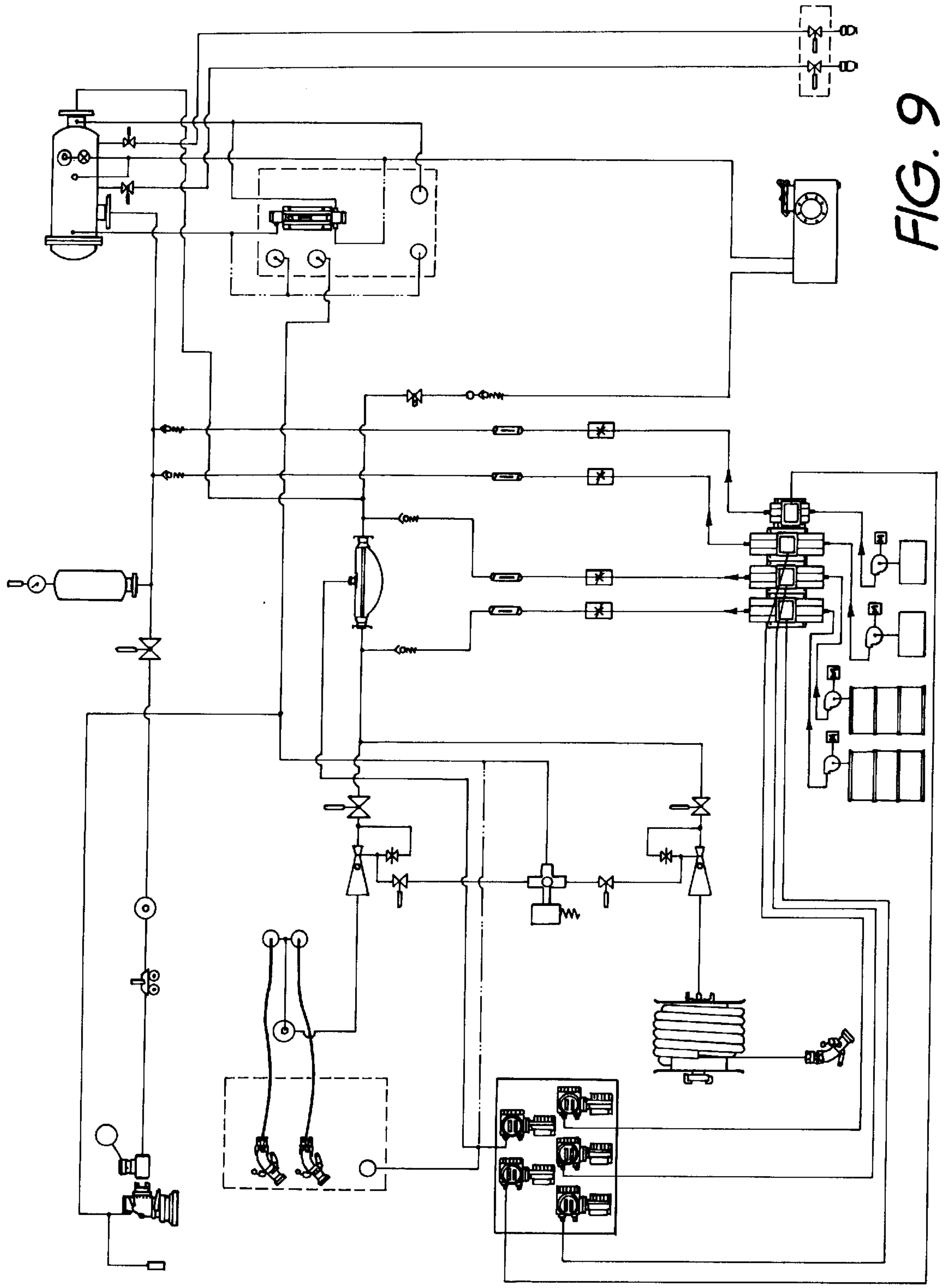
FIG. 9 is a typical fuel circuit for a hydrant servicer cart.

The pump unit can be fitted with a double diaphragm leak detection system 24 described with reference to FIG. 8. In this system, a vacuum is drawn between the two diaphragms. The output from the leak detector will be monitored by the computer system to shut down the system if a diaphragm fails. This two diaphragm system isolates hydraulic fluid used in the pump from the additive system to avoid contamination of the aircraft fuel with hydraulic fluid. The fuel additive pump 13 is sized to accommodate the required maximum and minimum flow rates for the particular additive.

The fuel additive injection sub-system will be controlled via a computer together with the other additive sub-systems. The computer can be programmed to monitor the dosing amounts of the fuel additives. The computer is capable of printing out a transaction ticket showing the details mentioned earlier.

Figure 10:
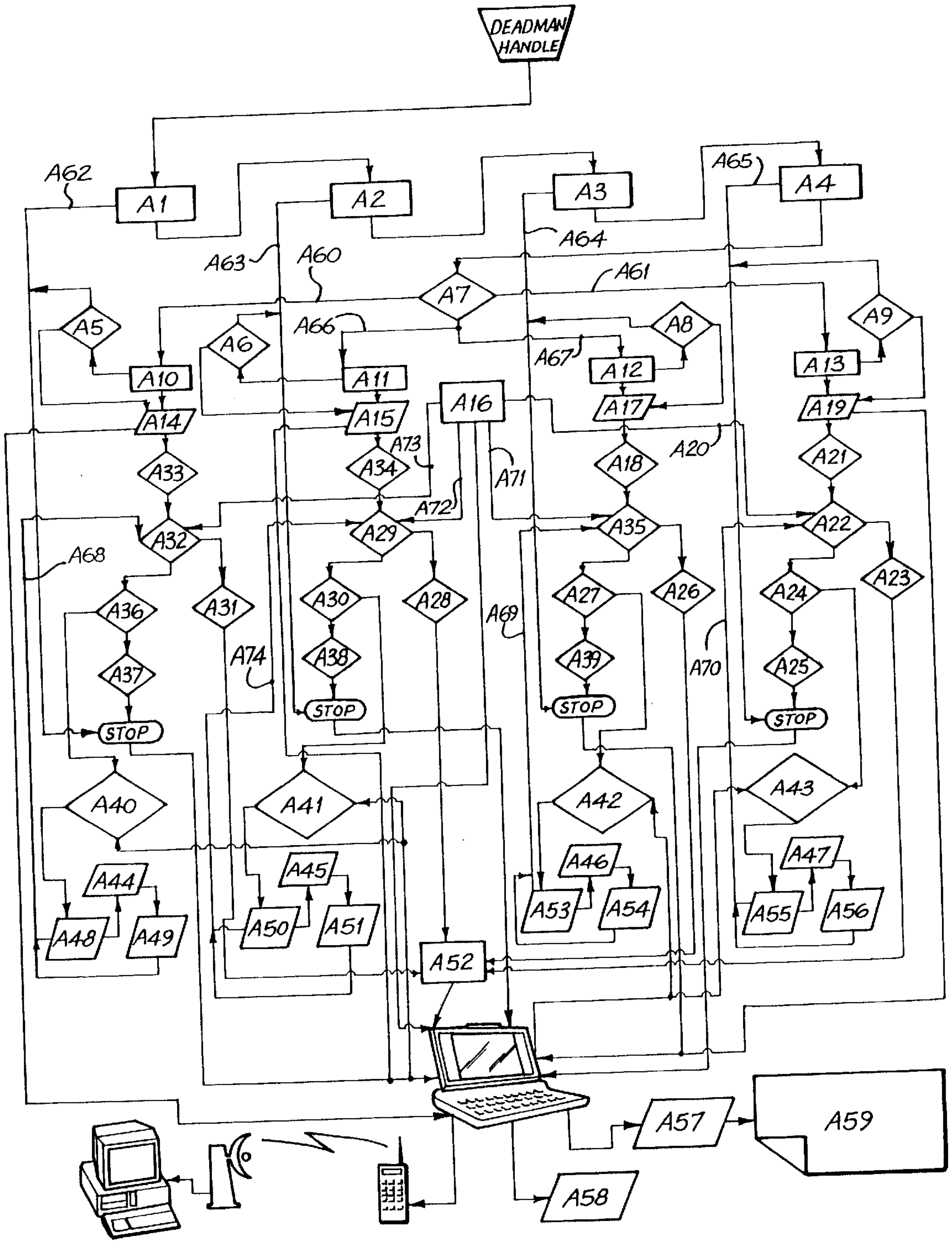
FIG. 10 is a schematic flow diagram illustrating the operation of a computer control means for a multi-additive injection system.

Further and with reference to FIG. 10, the computer system monitors the following and outputs an appropriate alarm condition as required:

With reference to FIG. 10, the computer system will process an input from a deadman handle that will be operated by the refuelling operator. This will be done manually. On receiving this input, the computer system will start the process of preliminary checks. These checks are as follows:

Check the content of the fuel additive tanks, if OK, the process will continue.

Start the fuel additive pumps.

Receive input from the mass flow meter for each fuel additive and from the mass flow meter of the main fuel line. If OK, the process will continue.

Verify that all fuel additive mass flow meters and main fuel line flow meters are reading flow. If OK, the process will continue.

Check the main fuel line fuel flow meter output and compare with the output of the fuel additive flow meters. The computer system will calculate the percentage concentration of additive in the fuel. The result will be compared with the figure pre-set within the computer system for each additive. If the result is within the minimum/maximum allowable value for the percentage concentration, the process will continue.

If the computer system cannot compare the percentage concentration between the minimum/maximum pre-set value, the system will adjust the stroke length of the appropriate fuel additive injection pump to adjust the value to bring it back into line with the pre-set value. The computer system will keep changing the stroke length to maintain the appropriate value. When the stroke length reaches 50% of its stroke, then the computer system will reduce the RPM of the 24 volt DC stepper motor to compensate.

Continuously check the percentage concentration of each fuel additive.

If the computer system cannot alter the stroke length and stepper motor speed to maintain the required percentage concentration, the computer system will shut down the refuelling operation.

The computer system will be capable of isolating one or more fuel additives that may not be required in a particular airport. When the appropriate additive is isolated, all the corresponding alarm systems must also be deactivated. An active display panel or light for each fuel additive must indicate to the operator that the additive system has been deactivated.

The computer system will power down all the meters when the aircraft refuelling hydrant car, self-powered hydrant cart or aircraft refuelling tanker is moved, driven or transported.

The computer system will have the following alarm conditions:

FSII fuel additive tank or tanks low level

APA101 fuel additive tank or tanks low level

C.I. fuel additive tank low level

Stadis fuel additive tank low level

Aviation fuel mass flow meter not reading

FSII fuel additive mass flow meter not reading

APA101 fuel additive mass flow meter not reading

C.I. fuel additive mass flow meter not reading

Stadis fuel additive mass flow meter not reading

FSII fuel additive metering pump not pumping

APA101 fuel additive metering pump not pumping

C.I. fuel additive metering pump not pumping

Stadis fuel additive metering pump not pumping

Computer system cannot calculate the percentage concentration required for the fuel additive even after changing the metering pump stroke length and stepper motor speed on the FSII system Computer system cannot calculate the percentage concentration required for the fuel additive even after changing the metering pump stroke length and stepper motor speed on APA101 system Computer system cannot calculate the percentage concentration required for the fuel additive after changing the metering pump stroke length and stepper motor speed on C.I. system Computer system cannot calculate the percentage concentration required for the fuel additive even after changing the metering pump stroke length and stepper motor speed on Stadis system Deadman handle has been released Air leak on PCV system Double-diaphragm leak detection system Power failure on FSII metering pump Power failure on APA101 metering pump Power failure on C.I. metering pump Power failure on Stadis metering pump Power failure on mass flow meters—Aviation fuel Meter Power failure on mass flow meters—FSII meter Power failure on mass flow meters—APA101 meter Power failure on mass flow meters—C.I. meter Power failure on mass flow meters—Stadis meter Over temperature metering pump motor for FSII system Over temperature metering pump motor for APA101 system Over temperature metering pump motor for C.I. system Over temperature metering pump motor for Stadis system Tachometer failure—Failure to detect shaft rotation on FSII system Tachometer failure—Failure to detect shaft rotation on APA101 system Tachometer failure—Failure to detect shaft rotation on C.I. system Tachometer failure—Failure to detect shaft rotation on Stadis system In FIG. 10, the box labels are used to designate the following features:

A1 Tank Level Gauge FSII Tank Tag. No. TG01

A2 Tank Level Gauge APA101 Tank Tag No. TG02

A3 Tank Level Gauge C.I. Tank Tag. No. TG03

A4 Tank Level Gauge Stadis Tank Tag. No. TG04

A5 Leak Detection System

A6 Leak Detection System

A7 All Level Gauges OK

A8 Leak Detection System

A9 Leak Detection System

A10 Start Pump TP01

A11 Start Pump TP02

A12 Start Pump TP03

A13 Start Pump TP04

A14 FSII Meter TM02

A15 APA101 Meter TM03

A16 Jet-A Meter TM01

A17 C.I. Meter TM04

A18 Verify That TM04 Has Output

A19 Stadis Meter TM05

A20 Flow Rate Output

A21 Verify That TM05 Has Output

A22 Check Flow Ratio

A23 Additive Ratio OK

A24 Additive Ratio Does Not Match

A25 Additive Ratio Cannot Be Obtained

A26 Additive Ratio OK

A27 Additive Ratio Does Not Match

A28 Additive Ratio OK

A29 Check Flow Ratio

A30 Additive Flow Ration Does Not Match

A31 Additive Ratio OK

A32 Check Flow Ratio

A33 Verify That TM02 Has Output

A34 Verify That TM03 Has Output

A35 Check Flow Ratio

A36 Additive Ratio Does Not Match

A37 Additive Ratio Cannot Be Obtained

A38 Additive Ratio Cannot Be Obtained

A39 Additive Ratio Cannot Be Obtained

A40 Adjust Pump Stroke and Speed to Maintain Ratio

A41 Adjust Pump Stroke and Speed to Maintain Ratio

A42 Adjust Pump Stroke and Speed to Maintain Ratio

A43 Adjust Pump Stroke and Speed to Maintain Ratio

A44 If Pump Stroke Set at $< 50\%$

A45 If Pump Stroke Set at < 50%

A46 If Pump Stroke Set at < 50%

A47 If Pump Stroke Set at < 50%

A48 Adjust Pump Stroke

A49 Adjust Motor Speed

A50 Adjust Pump Stroke

A51 Adjust Motor Speed

A52 Continue Refuelling

A53 Adjust Pump Stroke

A54 Adjust Motor Speed

A55 Adjust Pump Stroke

A56 Adjust Motor Speed

A57 Print Transaction Ticket

A58 Output Signal to PCV Solenoid

A59 Print Out
- Total Volume
- Total Mass
- FSII Total Volume
- APA101 Total Volume
- C.I. Total Volume
- Stadis Total Volume
- Date
- Flight Number
- Start Time
- Finish Time

A60 Output Start Signal TP01

A61 Output Start Signal TP04

A62 No Level

A63 No Level

A64 No Level

A65 No Level

A66 Output Start Signal TP02

A67 Output Start Signal TP03

A68 Adjust Pump Stroke Rate and Speed

A69 Adjust Pump Stroke Rate and Speed

A70 Adjust Pump Stroke Rate and Speed

A71 Flow Rate Output

A72 Flow Rate Output

A73 Flow Rate Output

A74 Adjust Pump Stroke Rate and Speed

It should be appreciated that the individual additive injection sub-systems can inject their respective additive at any point in-line with the aviation fuel line 6. Where the additive is FSII, it should be injected downstream of the aviation fuel filter as it would otherwise react with the fuel, forming a gel, clogging within the filter.

It should be appreciated that modification and alterations obvious to those skilled in the art are not to be considered as beyond the scope of the present invention. For example, it is not essential that the multi-additive injection system be used for aviation fuel as in modified form, it might be useful in injecting any fluid additives to any fluid stream. Furthermore, the invention is not limited to integration upon a hydrant servicer cart. For example, a module might be developed embodying all essential features of the invention, but being designed to be carried onto an aircraft for delivery to any commercial airport where additives could then be injected to fuel during a military refuelling operation. That is, military aircraft could land at nearby commercial airports to be refuelled, rather than having to fly to remote military bases where special fuel is available.

Further, it should be appreciated that whilst particular additive concentrations have been quoted above, these may be varied depending on the types of additives, the number of additives and the end use of the fuel to which the additives are being injected.

What is claimed is:

1. A multi-additive injection system for injecting required amounts of different additives to flowing fuel in a fuel line, the system comprising:
- a plurality of additive injection sub-systems, each sub-system comprising:
  - a source of additive,
  - a pump to deliver additive from said source to said fuel line,
  - additive metering means to measure an amount of said additive being delivered to said fuel line by said pump,
- said multi-additive injection system further comprising:
  - fuel metering means to measure an amount of fuel flowing through said fuel line, and
  - control means responsive to said additive metering means and said fuel metering means to control said pump of each sub-system to adjust said amount of additive being delivered by each said pump, should an amount of additive metered by said additive metering means deviate from a predetermined amount.

2. The system of claim 1 wherein each additive sub-system delivers its respective additive to said fuel line at a different position along said fuel line.

3. The system of claim 1 wherein said fuel line has in-line therewith a fuel filter.

4. The system of claim 3 wherein one or more of said additives is added up-stream of said filter and one or more of said additives is added to the fuel line down-stream of said filter.

5. The system of claim 1 wherein said additive metering means monitors mass and percentage concentration of said additive in relation to the flow rate of fuel in the fuel line.

6. The system of claim 1 wherein said additive metering means and fuel metering means act simultaneously while fuel is flowing through said fuel line.

7. The system of claim 1 wherein said additive metering means and fuel metering means comprise a computer system which records the respective amounts and calculates the percentage concentration of each additive according to pre-programmed data.

8. The system of claim 7 wherein said computer also acts as said control means.

9. The system of claim 1 wherein each said source of additive comprises an additive tank.

10. The system of claim 9 wherein each additive tank includes means for reading the level of additive therein.

11. The system of claim 7 wherein said computer continuously audits the levels of additive in each tank during operation.

12. The system of claim 11 wherein said computer records said levels of additive.

13. The system of claim 1 wherein four said additive injection sub-systems are provided, one for an anti-icing additive, another for a thermal stability improver additive, another for a corrosion inhibiter/lubricity enhancer additive and another for a static dissipater additive.

14. The system of claim 7 wherein the computer compares the flow rate of fuel within the fuel line with the flow rate of additive delivered by each additive injection sub-system to the fuel line so as to calculate a percentage concentration of each additive in the fuel within the fuel line.

15. The system of claim 14 wherein if said percentage concentration cannot be kept within a pre-determined minimum and maximum level, the computer system will shut down the refuelling operation.

16. The system of claim 1 wherein said fuel metering means comprises a mass flow meter.

17. The system of claim 1 wherein said additive metering means comprise mass flow meters.

18. The system of claim 9 wherein each fuel additive tank is sized according to the quantity of fuel required in a particular refuelling operation, each tank being fitted with an electronic level gauge, air vent and quick-disconnect suction line.

19. The system of claim 18 wherein each tank is manufactured from a material compatible with the additive intended to be stored therein.

20. The system of claim 9 wherein each additive tank is a container in which the additive is purchased and suction fittings are supplied to accommodate the container.

21. The system of claim 20 wherein the quantity of additive in each tank is monitored by a load cell or cells under each tank.

22. The system of claim 21 wherein for additives that are hydroscopic, the tank is provided with a silica gel crystal air vent to absorb water from the air.

23. The system of claim 21 wherein each additive tank is formed as a discrete compartment within a unitary structure.

24. The system of claim 23 wherein each compartment is provided with an air vent connected to a common manifold.

25. The system of claim 24 wherein the manifold is fitted with a silica gel crystal air vent to absorb water from the air.

26. The system of claim 23 wherein the unitary structure is provided with fork lift pockets to enable a fork lift truck to handle the structure.

27. The system of claim 1 wherein the pump for each additive is a metering type pump unit.

28. The system of claim 27 wherein the metering type pump unit has adjustable pump stroke and motor speed.

29. The system of claim 1 wherein each additive pump is fitted with a double-diaphragm leak detection system.

30. The system of claim 1 wherein each additive injection sub-system comprises a suction isolation valve, a suction strainer, a suction shut-off valve, a suction pressure gauge with isolation valve, a metering pump, a discharge pressure gauge with isolation valve, a relief valve piped back to the source of additive, a discharge shut-off valve and a pulsation dampener with isolation valve and drain valve back to the additive source.

31. The system of claim 7 wherein the computer system is capable of printing out a transaction ticket showing the following:

total amount of fuel having passed through the fuel line, total amount of each additive loaded in kilograms or pounds, flight details, aircraft serial number or flight number, date and time.

32. The system of claim 31 wherein information on the transaction ticket is transmitted by the computer system to a control office main frame computer or desktop computer to process information.

33. A hydrant servicer cart for use in refuelling aircraft, the hydrant servicer cart including a fuel line for receiving fuel from pressurised underground mains and for delivering the fuel to an aircraft, the fuel line having in-line therewith a fuel filter, the fuel line having connected thereto a multi-additive injection system for injecting required amounts of different additives to flowing fuel in said fuel line, the multi-additive system comprising:

a plurality of additive injection sub-systems, each sub-system comprising:

a source of additive, a pump to deliver additive from said source to said fuel line, additive metering means to measure an amount of said additive being delivered to said fuel line by said pump, said multi-additive injection system further comprising:

fuel metering means to measure an amount of fuel flowing through said fuel line, and control means responsive to said additive metering means and said fuel metering means to control said pump of each sub-system to adjust said amount of additive being delivered by each said pump, should an amount of additive metered by said additive metering means deviate from a predetermined amount, and wherein one or more of said additives is added to the fuel line downstream of said filter.

* * * * *